Figure 1:
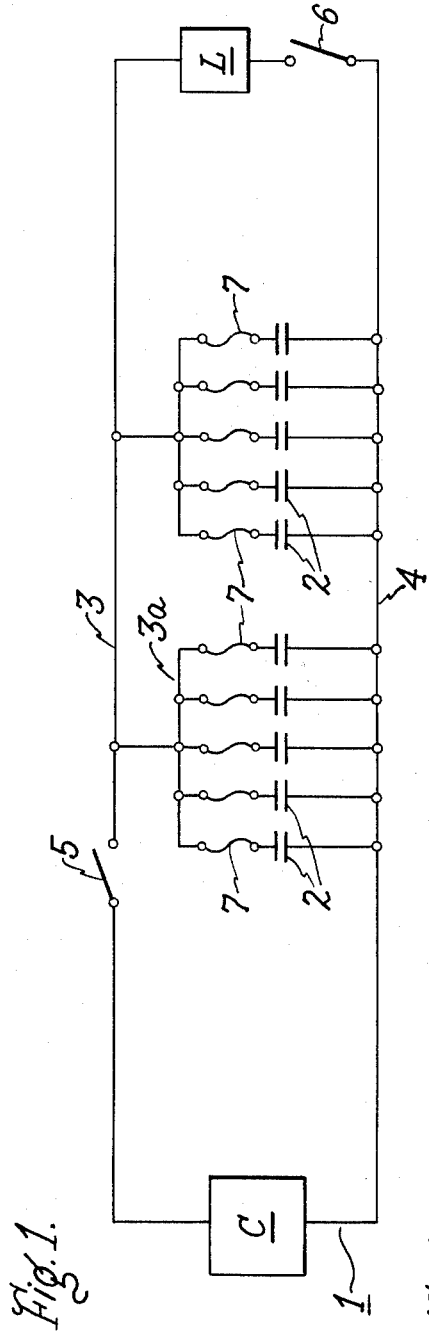

Jan. 25, 1966  C. R. CRAIG  3,231,701
CAPACITOR PROTECTIVE SYSTEM
Filed Sept. 14, 1962

Inventor,
Charles R. Craig,
by Sidney Greenberg
His Attorney.

3,231,701
CAPACITOR PROTECTIVE SYSTEM
Charles R. Craig, Glens Falls, N.Y., assignor to General Electric Company, a corporation of New York
Filed Sept. 14, 1962, Ser. No. 223,737
2 Claims. (Cl. 200—120)

The present invention relates to capacitor protective systems and more particularly to capacitor fuses for high voltage D.C. energy storage capacitor banks.

Fuses of various types have been applied to power factor correction capacitors on alternating current circuits for many years. The stored energy available to an individual fuse in banks of A.C. power capacitors is relatively small, however, and generally it is not necessary for a power fuse in such circumstances to interrupt the energy discharged into a faulted capacitor unit, but rather only to withstand the discharge and then interrupt the A.C. power current that follows.

In recent years, the need for very large electrical energy storage systems has resulted in extremely large banks of high voltage D.C. capacitors arranged in compact, low inductance, low resistance systems. When an individual capacitor unit in such high voltage, high energy systems experiences dielectric failure, violent rupture of the unit and considerable attendant damage to adjacent units and installations may occur unless the failed unit is disconnected from the circuit before the bank can discharge sufficient energy into it to cause such effects. The time required for such discharge is of the order of several microseconds, and the discharge current, if unrestrained, may approach magnitudes of the order of a million amperes. Under such circumstances, a very quick-acting discharge current-limiting fuse is required to disconnect a failed capacitor unit.

It is an object of the invention to provide a capacitor bank protective system, especially for large high voltage D.C. energy storage banks, having improved fuse protection.

It is another object of the invention to provide a fused capacitor bank system of the above type wherein the fusing action is rapidly effective, avoids violent rupture of faulted capacitors and consequent attendant damage to adjacent objects, is not attended by loud noise or expulsion of gases, flame or other explosion products, and is obtained by simple and economical means.

Other objects and advantages will become apparent from the following description and the appended claims.

To attain the above objects, there is provided in accordance with the invention a protective system comprising, in combination, a high voltage D.C. energy storage capacitor bank comprising a plurality of capacitors connected in parallel across a pair of line conductors, the plurality of capacitors being adapted to be charged to a voltage of about 5–20 kilovolts and to store at least 5,000 joules of electrical energy, and a fuse associated with each capacitor comprising an enclosed elongated tubular housing having an axial bore and a metal wire passing therethrough, the fuse operating by failure of the capacitor associated therewith and resulting in discharge therein of the stored electrical energy at the aforementioned voltage, the wire in the operation of the fuse exploding and interrupting the current from such discharge, whereby the capacitor associated with the fuse is disconnected from the remaining capacitors before it is ruptured by such discharge.

Figure 2:
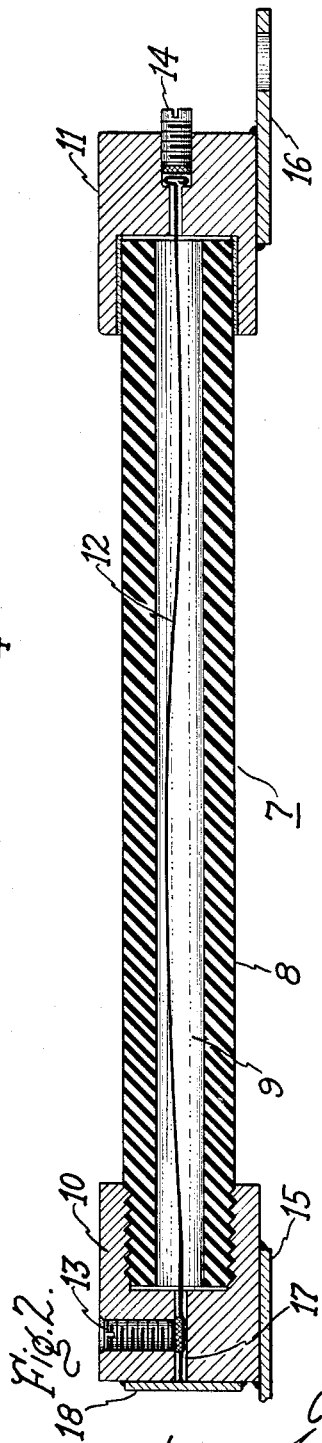

The invention will be better understood from the following description taken in conjunction with the accompanying drawing, in which:

FIGURE 1 is a simplified circuit diagram of a fused capacitor bank system of the invention; and FIGURE 2 is a longtiudinal sectional view of an embodiment of a fuse device which may be employed in accordance with the invention.

Referring now to the drawing, and particularly to FIGURE 1, there is shown a simplified circuit diagram of a high voltage energy storage D.C. capacitor bank 1 comprising a plurality of capacitors 2 connected in parallel between conductors 3 and 4, the capacitors being typically arranged in groups with a busbar 3a interconnecting the capacitors in each group as shown. As will be understood, in practice a considerably greater number of capacitors would normally be employed in the bank than shown in the drawing. For example, such banks may comprise as many as 2,300 six kilovolt capacitors, all in parallel and storing a total energy of 7,000,000 joules. A D.C. charging source C is connected across the bank for charging the capacitors with the desired amount of electrical energy and a switch 5 is provided for opening the charging circuit when capacitors 2 are sufficiently charged. Also connected in parallel with the capacitor bank is load L, constituted by any device for which the large amount of electrical energy stored in the capacitor bank is to be used. Switch 6 is provided for opening and closing the circuit to load L.

In banks of such large amounts of stored energy, the capacitors are arranged relatively close together in order to make maximum use of the available space, and the capacitors themselves are constructed to store as much energy as possible. If a capacitor unit in the bank fails, a considerable amount of energy from the other units of the system is discharged into the failed unit and may, unless the failed unit is rapidly and effectively disconnected from the circuit, result in rupture of its casing with consequent damage to adjacent units and other equipment, and constitute a danger to personnel in the vicinity.

In accordance with the invention, there is arranged in series with, and preferably closely adjacent to, each capacitor 2 a fuse 7 constructed as hereinafter disclosed for providing a rapidly effective, current-limiting fuse action to disconnect the faulted capacitor from the remainder of the bank circuit.

FIGURE 2 illustrates an embodiment of fuse 7 which comprises a tubular housing 8 made of a high strength electrically insulating material such as a phenolic resin epoxy or melamine-bonded fiberglass material having a central bore 9 closed at opposite ends by metal caps 10 and 11 which may be joined to the ends of tube 8 by a suitable cement or by a threaded connection, or by any other appropriate means. Fuse wire 12, which is preferably made of copper, is strong lengthwise through bore 9 and fastened in caps 10 and 11 by studs 13 and 14, respectively, threaded into the end caps. Electrical connection to the fuse wire 12 is made through metal caps 10 and 11 and the associated metal members 15, 16 which are connected respectively to the individual capacitor and adjacent busbar.

Cap 10 is provided with a narrow passage 17 through which the end of fuse wire 12 extends to the outer surface of cap 10, on which is located an indicator 18. The latter may be in the form of a thin sheet of material, such as paper or plastic film, covering the opening of passage 17 and in contact with wire 12. Sheet 18 serves to indicate, by the formation of a hole therein, when the fuse has operated.

The interior of tube 8, which contains only air surrounding fuse wire 12 and is not provided with any special arc quenching material therein, is thus entirely enclosed. If desired, however, a small open vent hole may be provided in an end cap to permit escape of some of the high pressure gas generated, in order to operate indicating means of different type than that shown.

The fuse device of the invention is constructed to operate on the "exploding wire" principle, while containing the explosion completely within the fuse enclosure. The "exploding wire" effect is the action that is observed when a considerable amount of electrical energy is discharged at high current from high voltage capacitors through a low inductance, low resistance circuit into a long metal wire of small diameter. The wire literally explodes with a brilliant flash of light, and considerable heat and pressure are generated in the path formed by the vaporized wire. There results a current-limiting fuse action which cuts off the current very quickly and leaves considerable energy and voltage remaining on the capacitors. A possible theoretical explanation of the fuse action of an exploding wire is that by this means sufficiently high temperature and pressure are generated in a few millionths of a second to change a metal conductor into a non-conductor, such that a discharge current flowing through this path is limited in magnitude and interrupted against the driving (recovery) voltage appearing across the fuse wire path.

The effective interruption of current and prevention of an arc restrike after the exploded wire action under the described conditions by fuses constructed in accordance with the invention was unexpected, especially in view of the absence of any expulsion blast action and any special arc-quenching filler material, such as relied on heretofore in known types of fuses. Furthermore, it would normally be considered in view of the very high peak temperatures and pressures generated by the exploded wire that an attempt to confine the latter in a small volume enclosure would involve a serious risk of explosion of the entire fuse enclosure. For example, it has been found that a 40-mil diameter straight copper wire exploded in an 8-inch long ⅜-inch bore high strength tube will interrupt a 9 kilovolt discharge in about 10 microseconds, absorbing about 10,000 joules energy and passing about 100,000 amperes peak current. This represents a power level of about 1,000,000 kilowatts and produces estimated peak temperatures of the order of 5,000° K. and peak pressures of the order of 2,000 atmospheres. It has, nevertheless, been found that the enclosed exploding wire fuse of the invention will safely confine the wire explosion and effect interruption and eliminate restrike, without attendant loud noise or expulsion action and using a simple, inexpensive construction.

Tests have shown that a copper wire of a diameter in the range of about 20 to 50 mils in a closed fuse enclosure which typically has a length about 8 to 15 inches and a bore diameter of about ⅜-inch provides an effective exploding wire fuse action, utilizing or absorbing in the fuse a discharge energy in the range of about 5,000 joules to 35,000 joules for a range of capacitor voltages of 5 to 20 kilovolts.

For a given material the wire diameter is determined principally by the $I^2t$ (ampere squared-seconds, or ampere-coulombs) content of the discharge current required to be carried from each capacitor in normal operation. Usually, also, the smaller the stored energy rating of the capacitors, the smaller will be the wire diameter required to carry normal discharge. From various "exploding wire" experiments and research it has been found that copper wire has the best over-all material characteristics of high conductivity, strength, low cost, and a high ratio between its resistance at the solid-to-liquid transition point and its resistance at the vapor-to-arc transition point (roughly 23:1). This latter characteristic means that copper will conduct a large amount of "action" ($I^2t$) under normal duty without melting, but that when required to operate as a fuse, a relatively small increase in "action" ($I^2t$) will explode the wire.

The insulating tube diameter and wall strength requirements are dependent on wire diameter and the magnitude of discharge energy required to explode the wire fast enough to force the discharge current to zero. These, in turn, are functions of the charged capacitor voltage and the total circuit constants. Experimentation shows that the aforementioned ⅜-inch bore, ¼-inch wall melamine-fiberglass tubing is best for the range of duty mentioned.

The insulating tube length (and therefore wire length) is most dependent upon the voltage against which interruption must be obtained and restrike prevented. The higher the voltage, the longer the tube must be, although not necessarily a first power proportionality.

The following table shows the results of typical tests made on enclosed fuses of the present invention, constructed with a melamine-bonded fiberglass tube enclosure 8 inches long with a ⅜-inch bore and having a copper wire of the indicated size passing therethrough, the wall thickness of the tube being ¼-inch, and a capacitance of 432 $\mu$f. and an inductance of 0.5 $\mu$h. characterizing the system:

TABLE I

| Wire diameter, mil | Voltage, kv. | | Stored energy, ws. | Dissipated energy, ws. | Peak current, ka. | Clearing time, $\mu$s |
| --- | --- | --- | --- | --- | --- | --- |
| | Initial | Final | | | | |
| 20 | 6 | 5.4 | 7,800 | 1,500 | 26 | 10 |
| 32 | 7.8 | 6.0 | 13,200 | 5,400 | 72.8 | 14 |
| 45.3 | 10 | 5.6 | 21,600 | 14,800 | 121 | 23 |

Where: mil = inches × 10⁻³; kv. = kilovolts; ws. = watt-seconds; ka. = kiloamperes; $\mu$s. = microseconds.

There is thus made possible by the invention a fuse-protected large D.C. energy storage capacitor bank having fuses which provide the combination of advantages of low cost, small size, freedom from noise, blast and flame, having high continuous-duty rating, and being useful in unlimited bank sizes.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An exploding wire fuse device for use with capacitors in a high voltage D.C. energy storage capacitor bank comprising, in combination, an elongated tubular housing of high strength electrically insulating melamine-bonded fiberglass closed at its ends by metal cap members, said tubular housing defining an elongated substantially constant diameter axial bore therein, the length of said housing being dependent upon the voltage against which interruption must be obtained and restrike prevented, said housing being about 8 to 15 inches long, having a wall thickness of at least about ¼ inch, and said bore being about ⅜ inch in diameter, and a copper wire having a diameter of about 20–50 mils extending through said bore and connected at its end to said metal cap members, said bore being free of material other than said wire and air, said fuse operating upon dielectric failure of the capacitor associated therewith and resulting in discharge therein of the high voltage electrical energy at instantaneous power levels of about 1,000,000 kilovolt-amperes in said capacitor bank, said wire in the operation of said fuse exploding and interrupting the current of said discharge, said fuse remaining closed without expelling gas or flame, whereby the capacitor associated with said fuse is disconnected from the remaining capacitors in the bank before it is ruptured by said discharge.

2. An exploding wire fuse device as recited in claim 1 including means on one of said cap members for providing indication when said wire has exploded within said fuse.

References Cited by the Examiner

UNITED STATES PATENTS

| | | | |
|---|---|---|---|
| 644,850 | 3/1900 | Davis | 200—131 |
| 770,034 | 9/1904 | Wright | 200—132 |
| 1,950,199 | 3/1934 | Tritle | 200—131 |
| 2,532,078 | 11/1950 | Baxter | 200—131 |

FOREIGN PATENTS 257,088  8/1926  Great Britain.

OTHER REFERENCES

McFarlane: "A High-Voltage Quick-Acting Fuse to Protect Capacitor Banks," Radiation Laboratory, University of California, Livermore Site, Livermore, California; Published for the atomic Energy Commission, August 9, 1956. Pages 1–24 relied upon.

BERNARD A. GILHEANY, *Primary Examiner.*